United States Patent
Mongillo et al.

(10) Patent No.: US 10,358,978 B2
(45) Date of Patent: Jul. 23, 2019

(54) GAS TURBINE ENGINE COMPONENT HAVING SHAPED PEDESTALS

(71) Applicant: UNITED TECHNOLOGIES CORPORATION, Hartford, CT (US)

(72) Inventors: Dominic J. Mongillo, West Hartford, CT (US); Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 715 days.

(21) Appl. No.: 14/772,398

(22) PCT Filed: Mar. 12, 2014

(86) PCT No.: PCT/US2014/023956
§ 371 (c)(1),
(2) Date: Sep. 3, 2015

(87) PCT Pub. No.: WO2014/150681
PCT Pub. Date: Sep. 25, 2014

(65) Prior Publication Data
US 2016/0017806 A1    Jan. 21, 2016

Related U.S. Application Data

(60) Provisional application No. 61/787,021, filed on Mar. 15, 2013.

(51) Int. Cl.
*F01D 5/18* (2006.01)
*F01D 9/04* (2006.01)
(Continued)

(52) U.S. Cl.
CPC ............... *F02C 7/18* (2013.01); *F01D 5/186* (2013.01); *F01D 5/187* (2013.01); *F01D 9/041* (2013.01);
(Continued)

(58) Field of Classification Search
CPC .......... F01D 5/186; F01D 5/187; F01D 5/188; F01D 9/06; F01D 9/065; F01D 25/30;
(Continued)

(56) References Cited

U.S. PATENT DOCUMENTS

| 4,514,144 A | 4/1985 | Lee |
| 5,232,343 A | 8/1993 | Butts |

(Continued)

FOREIGN PATENT DOCUMENTS

| EP | 1188902 A1 | 3/2002 |
| EP | 1607577 A2 | 12/2005 |
| EP | 1617043 B1 | 6/2008 |

OTHER PUBLICATIONS

Nozzle Applet, http://www.dept.aoe.vt.edu/~devenpor/aoe3114/6%20-%20Nozzles.pdf, first retrieved from the internet on Mar. 12, 2001.*

(Continued)

*Primary Examiner* — Christopher Verdier
(74) *Attorney, Agent, or Firm* — Carlson, Gaskey & Olds, P.C.

(57) ABSTRACT

A component according to an exemplary aspect of the present disclosure includes, among other things, a first wall, a second wall and at least one row of shaped pedestals extending between the first wall and the second wall. The at least one row of shaped pedestals includes a first set of C-shaped pedestals and a second set of C-shaped pedestals adjacent to the first set of C-shaped pedestals.

18 Claims, 6 Drawing Sheets

(51) Int. Cl.
*F01D 9/06* (2006.01)
*F02C 7/18* (2006.01)
*F02C 7/25* (2006.01)
*F02K 1/82* (2006.01)
*F23R 3/16* (2006.01)
*F01D 11/08* (2006.01)
*F01D 25/12* (2006.01)
*F01D 25/30* (2006.01)

(52) U.S. Cl.
CPC .............. *F01D 11/08* (2013.01); *F01D 25/12* (2013.01); *F01D 25/30* (2013.01); *F02C 7/25* (2013.01); *F02K 1/822* (2013.01); *F01D 9/065* (2013.01); *F05D 2220/32* (2013.01); *F05D 2240/11* (2013.01); *F05D 2240/12* (2013.01); *F05D 2240/127* (2013.01); *F05D 2240/30* (2013.01); *F05D 2240/35* (2013.01); *F05D 2250/141* (2013.01); *F05D 2250/185* (2013.01); *F05D 2250/711* (2013.01); *F05D 2250/712* (2013.01); *F05D 2250/75* (2013.01); *F05D 2260/201* (2013.01); *F05D 2260/202* (2013.01); *F05D 2260/204* (2013.01); *F05D 2260/2212* (2013.01); *F05D 2260/22141* (2013.01); *F23R 3/16* (2013.01); *F23R 2900/03045* (2013.01); *Y02T 50/675* (2013.01)

(58) Field of Classification Search
CPC ...... F01D 11/08; F01D 25/12; F05D 2240/11; F05D 2250/184; F05D 2250/185; F05D 2250/711; F05D 2250/712; F05D 2240/127; F05D 2240/35; F05D 2260/201; F05D 2260/20; F05D 2260/202; F05D 2260/204; F05D 2260/2212; F05D 2260/22141; F23R 3/16; F23R 2900/03045
USPC ............. 415/115, 116; 416/96 R, 96 A, 97 R
See application file for complete search history.

(56) References Cited

U.S. PATENT DOCUMENTS

| | | |
|---|---|---|
| 5,395,212 A | 3/1995 | Anzai et al. |
| 5,797,726 A | 8/1998 | Lee |
| 5,967,752 A | 10/1999 | Lee et al. |
| 5,971,708 A | 10/1999 | Lee |
| 6,068,445 A | 5/2000 | Beeck et al. |
| 6,224,336 B1 | 5/2001 | Kercher |
| 6,331,098 B1 | 12/2001 | Lee |
| 6,402,470 B1* | 6/2002 | Kvasnak ............ F01D 5/187 415/115 |
| 6,554,571 B1 | 4/2003 | Lee et al. |
| 7,637,720 B1 | 12/2009 | Liang |
| 7,753,650 B1 | 7/2010 | Liang |
| 7,785,071 B1 | 8/2010 | Liang |
| 8,376,706 B2 | 2/2013 | Bunker et al. |
| 8,506,252 B1* | 8/2013 | Liang ................ F01D 5/187 416/90 R |
| 2006/0042255 A1* | 3/2006 | Bunker ............... F01D 25/12 60/752 |
| 2006/0210399 A1* | 9/2006 | Kitamura ............ F01D 5/186 416/97 R |
| 2007/0177976 A1* | 8/2007 | Cunha ................. B22C 9/04 416/97 R |
| 2008/0107519 A1 | 5/2008 | Ahmad |
| 2010/0226762 A1* | 9/2010 | Lutjen ............... F01D 5/187 415/178 |
| 2011/0176930 A1 | 7/2011 | Ahmad et al. |
| 2012/0207591 A1 | 8/2012 | Lee et al. |
| 2012/0328450 A1 | 12/2012 | Spangler et al. |

OTHER PUBLICATIONS

International Search Report and Written Opinion of the International Searching Authority for International application No. PCT/US2014/023956 dated Jul. 11, 2014.

The Extended European Search Report for Application No. 14767968.2, dated Dec. 9, 2016.

* cited by examiner

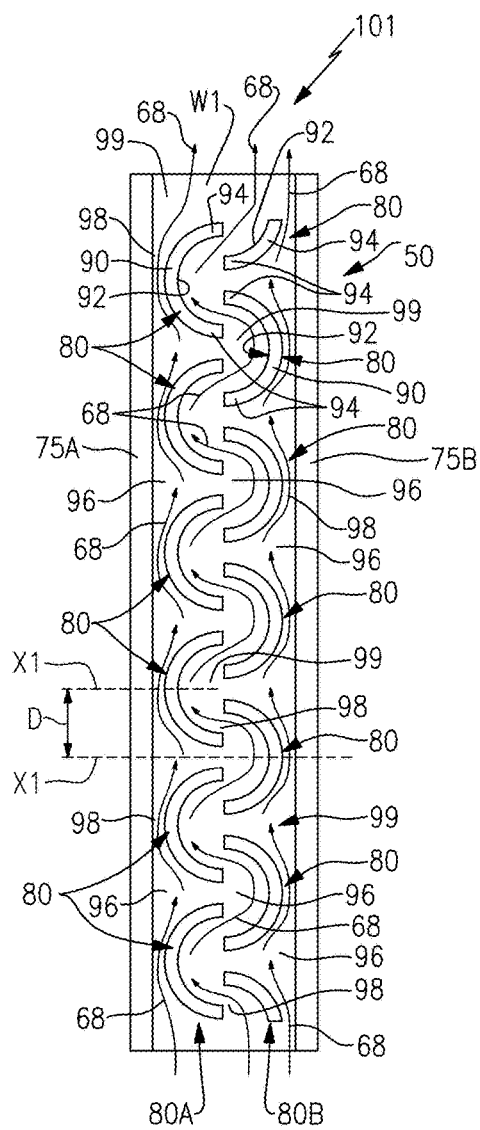
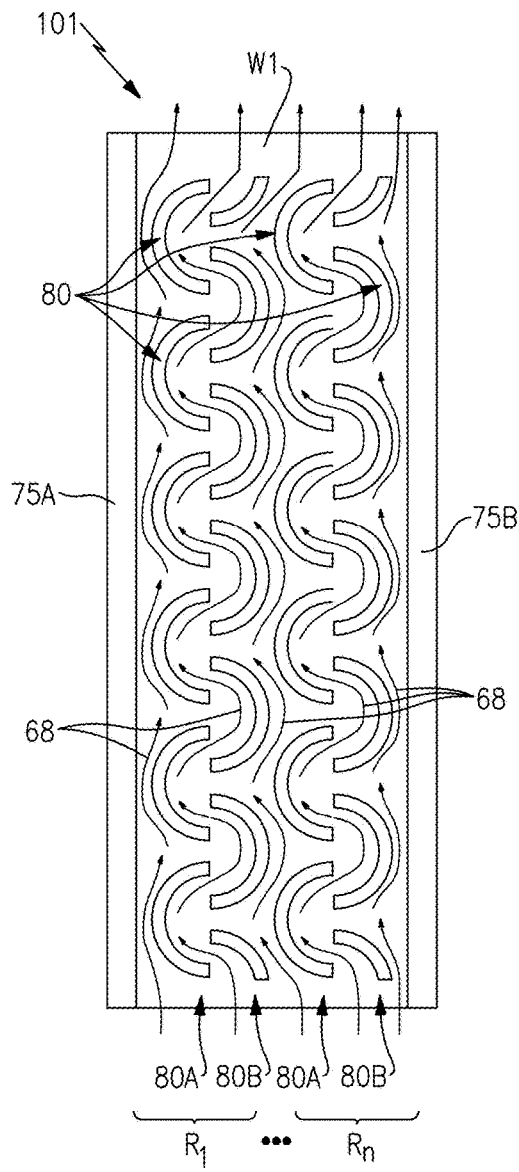
FIG.4
FIG.5

GAS TURBINE ENGINE COMPONENT HAVING SHAPED PEDESTALS

BACKGROUND

This disclosure relates to a gas turbine engine, and more particularly to a gas turbine engine component cooling system that includes at least one row of C-shaped or semicircular shaped pedestals.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of the gas turbine engine may include internal cooling passages that route cooling air through the part. A variety of interior treatments may be incorporated into the internal cooling passages to augment the heat transfer effect and improve cooling. For example, some cooling passages may include pedestals, air-jet impingement, or turbulator treatments.

SUMMARY

A component according to an exemplary aspect of the present disclosure includes, among other things, a first wall, a second wall and at least one row of shaped pedestals extending between the first wall and the second wall. The at least one row of shaped pedestals includes a first set of C-shaped pedestals and a second set of C-shaped pedestals adjacent to the first set of C-shaped pedestals.

In a further non-limiting embodiment of the foregoing component, the first wall and the second wall are part of either a main body or a microcircuit of the component.

In a further non-limiting embodiment of either of the foregoing components, the pedestals of each of the first and second sets of C-shaped pedestals are spaced from one another.

In a further non-limiting embodiment of any of the foregoing components, the component is one of a blade, a vane, a blade outer air seal (BOAS), a combustor liner and a turbine exhaust case liner.

In a further non-limiting embodiment of any of the foregoing components, the second set of C-shaped pedestals are axially offset and radially staggered relative to the first set of C-shaped pedestals.

In a further non-limiting embodiment of any of the foregoing components, each of the shaped pedestals include a convex portion and a concave portion that extend between ends.

In a further non-limiting embodiment of any of the foregoing components, the first set of C-shaped pedestals and the second set of C-shaped pedestals are disposed axially between a first cavity wall and a second cavity wall.

In a further non-limiting embodiment of any of the foregoing components, concave portions of the first set of C-shaped pedestals face toward ends of the second set of C-shaped pedestals.

In a further non-limiting embodiment of any of the foregoing components, the row of shaped pedestals includes at least one acceleration region.

In a further non-limiting embodiment of any of the foregoing components, the row of shaped pedestals includes at least one acceleration region and at least one deceleration region.

In a further non-limiting embodiment of any of the foregoing components, the component comprises cooling holes disposed in open spaces between the first set of C-shaped pedestals and the second set of C-shaped pedestals.

A gas turbine engine according to an exemplary aspect of the present disclosure includes, among other things, a component that extends into a core flow path of the gas turbine engine. The component includes a cooling system having a first set of semicircular pedestals disposed inside of the component and a second set of semicircular pedestals adjacent to the first set of semicircular pedestals.

In a further non-limiting embodiment of the foregoing gas turbine engine, the cooling system is a radial flow cooling system.

In a further non-limiting embodiment of either of the foregoing gas turbine engines, the cooling system is an axial flow cooling system.

In a further non-limiting embodiment of any of the foregoing gas turbine engines, the first and second sets of semicircular pedestals include at least one acceleration region and at least one deceleration region.

In a further non-limiting embodiment of any of the foregoing gas turbine engines, the first and second sets of semicircular pedestals include multiple acceleration regions.

In a further non-limiting embodiment of any of the foregoing gas turbine engines, the cooling system includes multiple rows of shaped pedestals.

A method of cooling a component of a gas turbine engine according to another exemplary aspect of the present disclosure includes, among other things, accelerating a flow of a cooling fluid between a first set of shaped pedestals and a second set of shaped pedestals.

In a further non-limiting embodiment of the foregoing method, the method comprises decelerating the flow of the cooling fluid prior to striking one of the first set of shaped pedestals and the second set of shaped pedestals and accelerating the cooling fluid a second time prior to striking the other of the first set of shaped pedestals and the second set of shaped pedestals.

In a further non-limiting embodiment of either of the foregoing methods, the method comprises impingement cooling the second set of shaped pedestals with the cooling fluid, accelerating the cooling fluid a second time, and impingement cooling the first set of shaped pedestals with the cooling fluid after accelerating the cooling fluid the second time.

A component according to an exemplary aspect of the present disclosure includes, among other things, a first wall, a second wall and at least one row of pedestals extending between the first wall and the second wall, the at least one row of pedestals having a first set of C-shaped pedestals.

In a further non-limiting embodiment of the foregoing component, the at least one row of pedestals includes a second set of C-shaped pedestals adjacent to the first set of C-shaped pedestals.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 illustrates a portion of a cooling system that can be incorporated into a gas turbine engine.

FIG. 5 illustrates another embodiment.

DETAILED DESCRIPTION

Figure 1:
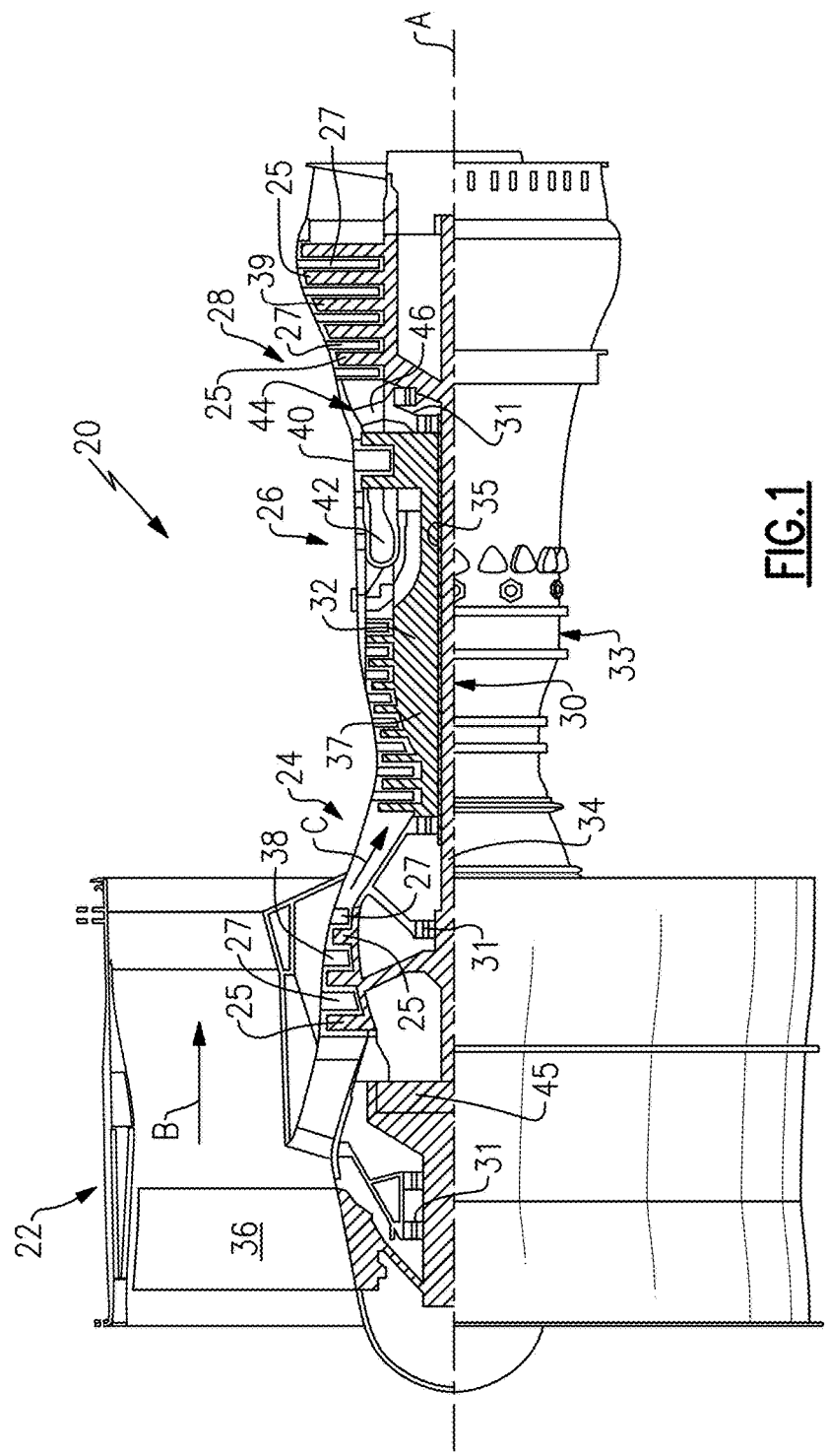
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram° R)/(518.7° R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling systems for cooling the parts during engine operation.

This disclosure relates to cooling systems that can be incorporated into gas turbine engine components. Among other features, the exemplary cooling systems described herein include one or more rows of C-shaped (or semicircular) pedestals that can create areas of accelerated and/or decelerated cooling flow, thereby providing a relatively high convective heat transfer for cooling gas turbine engine components. The geometry and shape of the exemplary pedestals of this disclosure provide a greater amount of convective surface area compared to conventional augmentation features.

Figure 2:
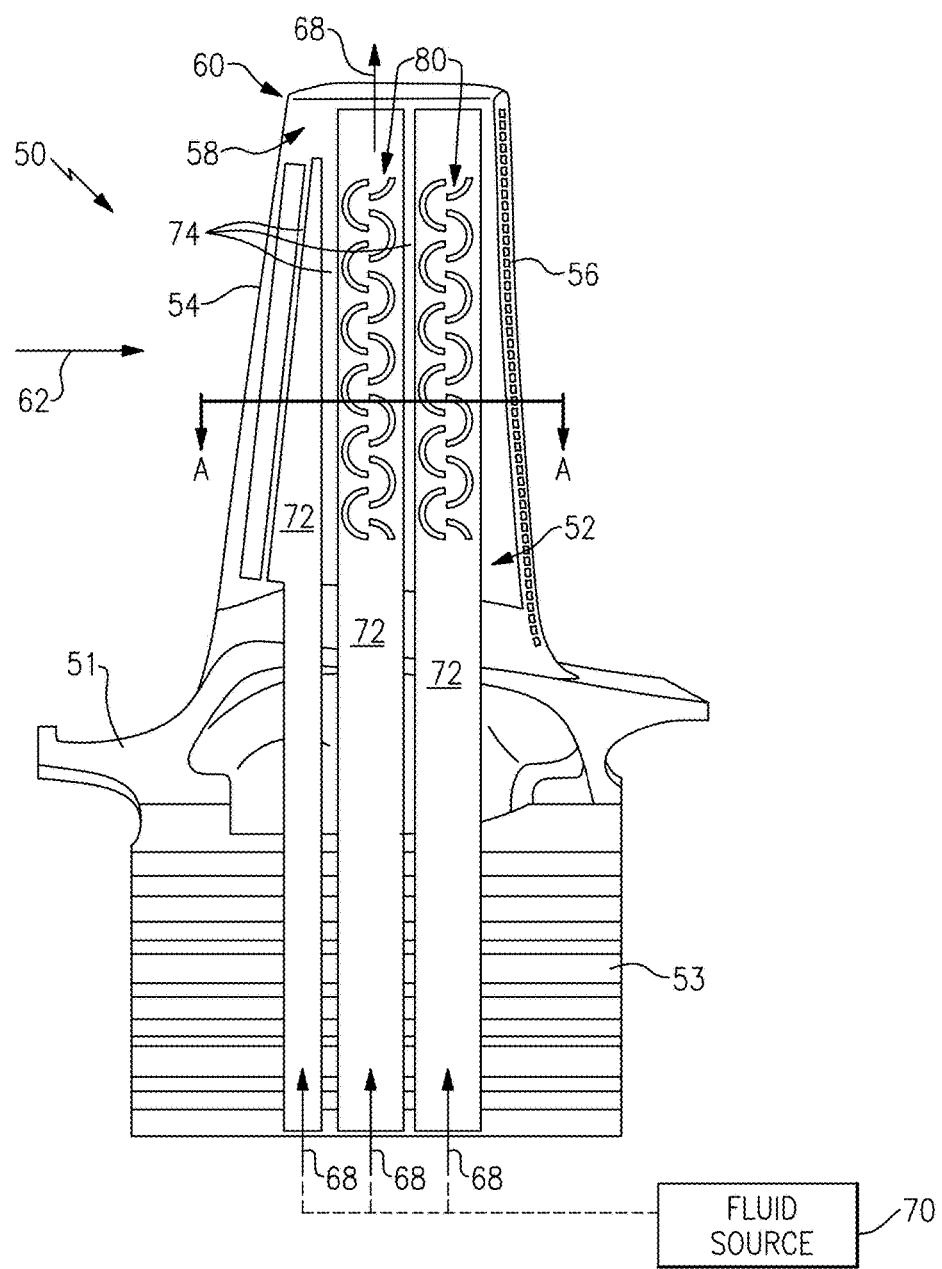
FIG. 2 illustrates a component that can be incorporated into a gas turbine engine.
Figure 3A:
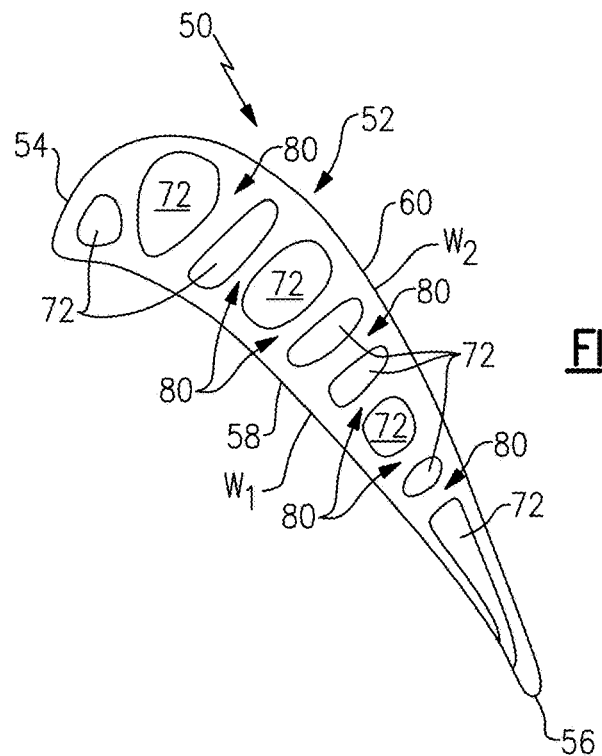
FIGS. 3A and 3B illustrate cross-sectional views taken through section A-A of FIG. 2.
Figure 3B:
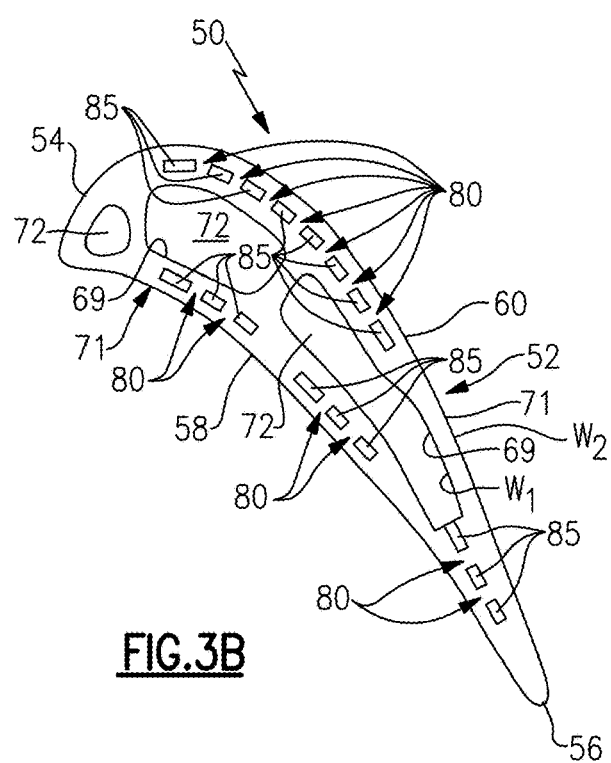

FIGS. 2, 3A and 3B illustrate a component 50 that can be incorporated into a gas turbine engine, such as the gas turbine engine 20 of FIG. 1. In the illustrated embodiment, the component 50 is a turbine blade. However, the features of this disclosure may be incorporated into any blade, vane, blade outer air seal (BOAS), combustor liner, turbine exhaust case liner, or any other part that may require dedicated cooling.

The component 50 includes a body 52 that axially extends between a leading edge portion 54 and a trailing edge portion 56. The body 52 may additionally include a first wall 58 (e.g., a pressure side wall) and a second wall 60 (e.g., a suction side wall) that are spaced apart from one another and that join at each of the leading edge portion 54 and the trailing edge portion 56.

In one embodiment, the body 52 is representative of an airfoil. For example, the body 52 could be an airfoil that extends from a platform 51 and a root 53 where the component 50 is a blade, or could extend between inner and outer platforms (not shown) where the component 50 is a vane. Alternatively, the body 52 could include a platform or any other part of the component 50.

A gas path 62 is communicated axially downstream through the gas turbine engine 20 along the core flow path C (see FIG. 1) in a direction that extends from the leading edge portion 54 toward the trailing edge portion 56 of the body 52. The gas path 62 represents the communication of core airflow along the core flow path C.

One or more cavities 72 may be disposed inside of the body 52 as part of an internal cooling system for cooling portions of the component 50. The cavities 72 may extend radially, axially and/or circumferentially inside of the body 52 to establish cooling passages for receiving a cooling fluid 68 that is circulated therein to cool the component 50. The cooling fluid 68 may be communicated into one or more of the cavities 72 from a fluid source 70 that is external to the component 50.

The cooling fluid 68 is generally of a lower temperature than the airflow of the gas path 62 that is communicated across the body 52. In one particular embodiment, the cooling fluid 68 is a bleed airflow that can be sourced from the compressor section 24 or any other portion of the gas turbine engine 20 that includes a lower temperature than the core airflow of the gas path 62. The cooling fluid 68 can be passed through the cavities 72 to transfer thermal energy from the component 50 to the cooling fluid 68, thereby cooling the component 50. The cooling system can include any number of cavities 72, including only a single cavity. The cavities 72 may either be in fluid communication with one another or could be fluidly isolated from one another.

One or more ribs 74 may extend between the first wall 58 and the second wall 60 of the body 52. In one embodiment, adjacent cavities 72 of the component 50 are axially bound by ribs 74 that extend on either side of each cavity 72.

One or more rows of C-shaped pedestals 80 may be disposed inside of the component 50 as part of the internal cooling system for cooling the component 50 with the cooling fluid 68. Referring to FIG. 3A, the C-shaped pedestals 80 may be arranged as part of a main body cooling system. In a main body cooling system, for example, the C-shaped pedestals 80 extend between the first wall 58 and the second wall 60 of the component 50 to create areas of relatively high convective heat transfer. The C-shaped pedestals 80 may be disposed near the leading edge portion 54, the trailing edge portion 56, or both.

In an alternative embodiment, shown in FIG. 3B, the C-shaped pedestals 80 are incorporated into a microcircuit design of the component 50. For example, the component 50 may include one or more microcircuits 85 formed inside of the first wall 58 and/or the second wall 60 (or any other wall) of the component 50. The C-shaped pedestals 80 can be arranged to extend between adjacent microcircuits 85, which are located anywhere inside the component 50. In one embodiment, the C-shaped pedestals 80 extend between an interior surface 69 and an exterior surface 71 of the first wall 58 and/or the second wall 60 of the component 50. The interior surfaces 69 may define an outer periphery of the cavities 72, while the exterior surfaces 71 represent the outer skin of the component 50. It should be appreciated that the design, configuration and placement of the numerous C-shaped pedestals 80 shown in FIGS. 2, 3A and 3B are exemplary only and are in no way intended to limit this disclosure.

FIG. 4 illustrates a portion of a cooling system 101 that may be incorporated into one or more sections of a component 50. The exemplary cooling system 101 includes a plurality of C-shaped or semicircular pedestals 80. The C-shaped pedestals 80 extend between a first wall W1 and a second wall W2 of the component 50 (the second wall W2 is removed from FIG. 4 for ease of reference). In one embodiment, the first and second walls W1, W2 are the pressure and suction side walls (see FIG. 3A) of the component 50 (such as for a main body design). In another embodiment, the first and second walls W1, W2 are the interior and exterior surfaces 69, 71 (see FIG. 3B) of the component 50 (such as for a microcircuit design). However, the C-shaped pedestals 80 of this disclosure could be incorporated into any wall of the component 50. The C-shaped pedestals 80 may be manufactured using either ceramic cores or refractory metal cores, or using additive manufacturing technologies.

In one embodiment, the row of C-shaped pedestals 80 includes a first set of C-shaped pedestals 80A and a second set of C-shaped pedestals 80B adjacent to the first set of C-shaped pedestals 80A. The second set of C-shaped pedestals 80B may be axially offset and radially staggered from the first set of C-shaped pedestals 80A. Additional rows of C-shaped pedestals 80 could extend between the first wall W1 and the second wall W2 of the component 50 (see FIG. 5). The first and second sets of C-shaped pedestals 80A, 80B each include a plurality of radially spaced C-shaped pedestals 80. In one embodiment, the row of C-shaped pedestals 80 is axially positioned between a first cavity wall 75A and a second cavity wall 75B of the component 50.

In one embodiment, the C-shaped pedestals 80 include a semicircular or curved structure that may be referred to as a "macaroni" design. Each C-shaped pedestal 80 includes a convex portion 90 and a concave portion 92 that extend between ends 94. The ends 94 of each C-shaped pedestal 80 face toward a concave portion 92 of the opposite set of C-shaped pedestals 80A or 80B. Open spaces 96 extend between the ends 94 and the concave portions 92 of each C-shaped pedestal 80. In addition, the ends 94 of the first set of C-shaped pedestals 80A may be radially offset from the ends 94 of the second set of C-shaped pedestals 80B (i.e. axes X1 through the concave portions 92 of the first and second sets of C-shaped pedestals 80A, 80B are offset by a distance D).

The convex portions 90 of the first set of C-shaped pedestals 80A may face toward the first cavity wall 75A, while the convex portions 90 of the second set of C-shaped pedestals 80B may face toward the second cavity wall 75B. In other words, the concave portions 92 of the first and second sets of C-shaped pedestals 80A, 80B face in a direction that is toward one another.

The row of C-shaped pedestals 80 may additionally establish multiple acceleration regions 98 and deceleration regions 99 due, at least in part, to the positioning of the first set of C-shaped pedestals 80A relative to the second set of C-shaped pedestals 80B. The acceleration regions 98 accelerate the flow of cooling fluid 68, and the deceleration regions 99 decelerate the flow of cooling fluid 68 as it is circulated around the C-shaped pedestals 80 in the space that extends between the first cavity wall 75A and the second cavity wall 75B. In one embodiment, acceleration regions 98 extend between the ends 94 of adjacent C-shaped pedestals 80 and also between convex portions 90 of the C-shaped pedestals 80 and the cavity walls 75A, 75B. Deceleration regions 99 may exist in the open spaces 96 between the ends 94 and the concave portions 94 as well between the cavity walls 75A, 75B and the ends 94.

In the radial flow cooling system 101 illustrated in FIG. 4, cooling fluid 68 may be radially communicated through the cooling system 101 between the first cavity wall 75A and the second cavity wall 75B. The cooling fluid 68 is forced to move around the C-shaped pedestals 80 as it migrates along the radial path. For example, the cooling fluid 68 may be communicated through the acceleration regions 98 and deceleration regions 99 that exist between the first set of C-shaped pedestals 80A and the first cavity wall 75A and the second set of C-shaped pedestal 80B and the second cavity wall 75B.

In addition, the cooling fluid 68 may circulate between the first and second sets of C-shaped pedestals 80A, 80B to augment the heat transfer effect of the cooling system 101. For example, the cooling fluid 68 is first communicated through an acceleration region 98 between ends 94 of adjacent C-shaped pedestals 80, which accelerates the flow of the cooling fluid 68. Next, the cooling fluid 68 enters a deceleration region 99 within open spaces 96 to decelerate the cooling fluid 68 before striking the concave portions 92 of the C-shaped pedestals 80 of either the first or second sets of C-shaped pedestals 80A, 80B. The concave portions 92 of the C-shaped pedestal 80 redirect the cooling fluid 68 toward the opposite set of C-shaped pedestals 80A, 80B. The cooling fluid 68 may be directed through another acceleration region 98 prior to striking the oppose set of C-shaped pedestals 80A, 80B. The cooling fluid 68 may continue along such a tortuous path in order to accelerate and decelerate the cooling fluid 68 as it migrates from the first set of C-shaped pedestals 80A to the second set of C-shaped pedestals 80B and back again, thereby providing relatively high convective heat transfer prior to expelling the cooling fluid 68 from the component 50.

Referring to FIG. 5, the cooling system 101 may incorporate multiple rows R1 through $R_n$ of C-shaped pedestals 80 that are disposed inside the component 50 between the walls W1 and W2. The actual number of rows $R_n$ may vary and could depend on the cooling requirements of the component 50, among other features. Each row R1 to $R_n$ can include a first set of C-shaped pedestals 80A and a second set of C-shaped pedestals 80B that are configured to accelerate/decelerate cooling fluid 68 through the component 50.

Figure 6:
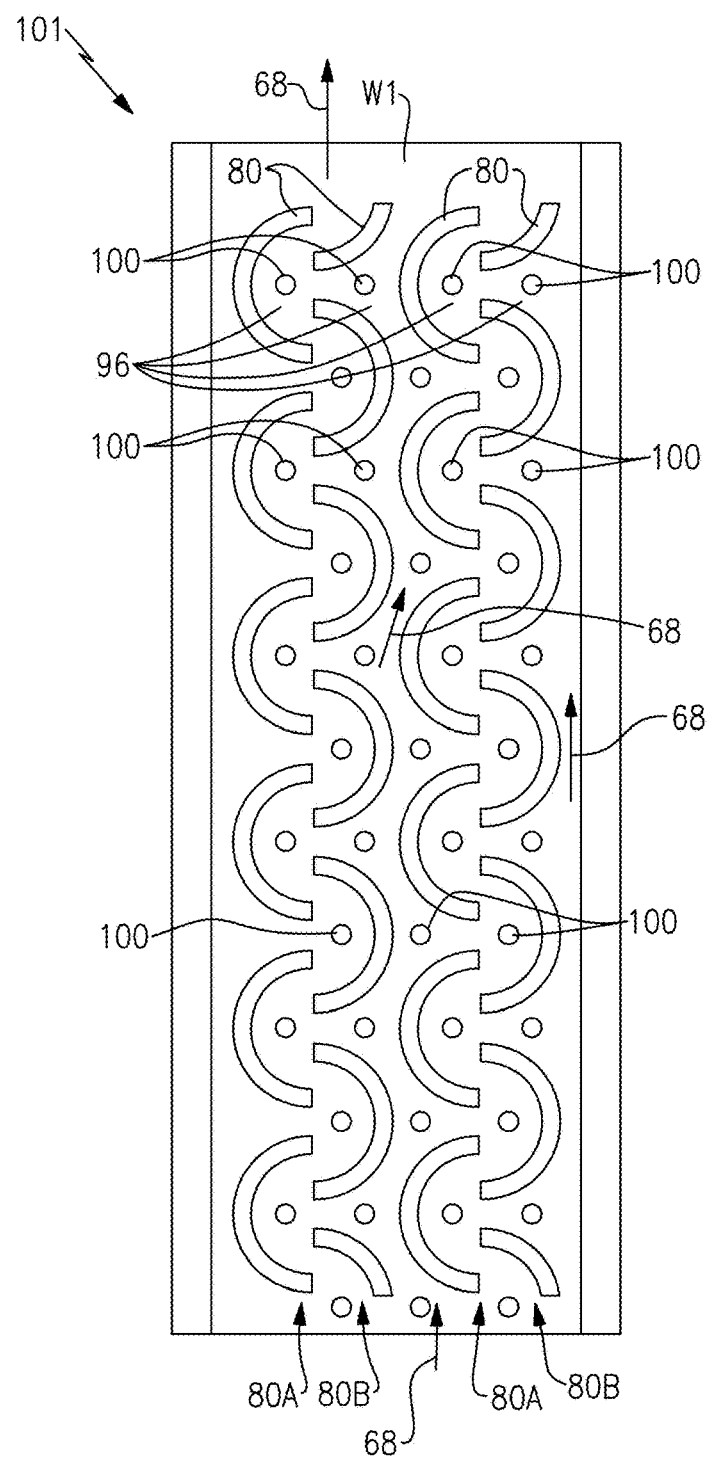
FIG. 6 illustrates yet another embodiment.

FIG. 6 illustrates another embodiment that includes a plurality of cooling holes 100 that can be disposed between the sets of C-shaped pedestals 80A, 80B. In one embodiment, the cooling holes 100 are formed in the open spaces 96 that extend adjacent to each C-shaped pedestal 80. The cooling fluid 68 may be expelled from the component 50 through the cooling holes 100. The cooling holes 100 may be film cooling holes or another type of cooling hole.

Figure 7:
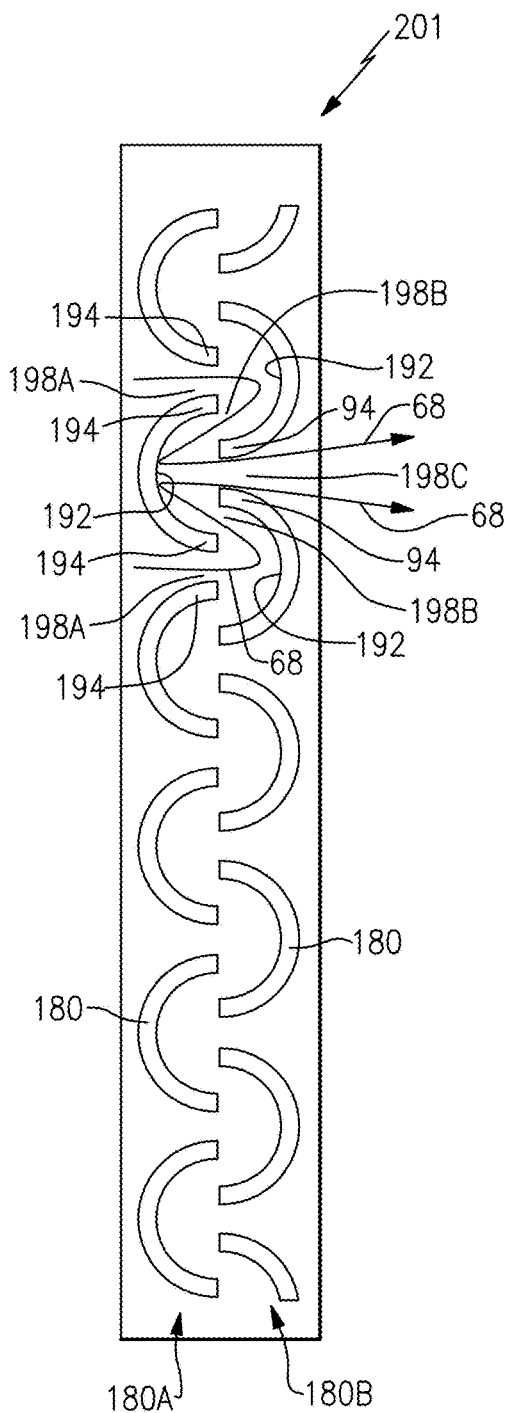
FIG. 7 illustrates yet another cooling system embodiment.

FIG. 7 illustrates another exemplary cooling system 201. The cooling system 201 includes a row of C-shaped pedestals 180. The structural characteristics of the row of C-shaped pedestals 180 are similar to the row of C-shaped pedestals 80 of the embodiment of FIG. 4. However, in this embodiment, cooling fluid 68 is axially communicated along a tortuous path around a first set of C-shaped pedestals 180A and a second set of C-shaped pedestals 180B. The cooling fluid 68 may circulate between the first and second sets of C-shaped pedestals 180A, 180B to augment the heat transfer effect of the axial flow cooling system.

For example, the cooling fluid 68 is first communicated through a first acceleration region 198A between ends 194 of adjacent pedestals of the first set of C-shaped pedestals 180A to cause the cooling fluid 68 to impinge onto concave portions 192 of the second set of C-shaped pedestals 180B. The concave portions 192 of the second set of C-shaped pedestals 180B redirect the cooling fluid 68 toward the first set of C-shaped pedestals 180A. The cooling fluid 68 may then enter a second acceleration region 198B between ends 194 of adjacent pedestals of both the first and second sets of C-shaped pedestals 180A, 180B prior to impinging on concave portions 192 of the first set of C-shaped pedestals 180A. In other words, the same airflow 68 may be used twice for impingement cooling the component 50. Finally, the cooling fluid 68 is communicated through a third acceleration region 198C between ends 94 of adjacent pedestals of the second set of C-shaped pedestals 180B prior to exiting the axial flow cooling system 201. In one embodiment, the cooling fluid 68 may be discharged through a trailing edge exit after exiting the axial flow cooling system 201.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a component that extends into a core flow path of said gas turbine engine having an engine centerline longitudinal axis, wherein said component includes a cooling system having:
a first set of semicircular pedestals spaced apart in a radial direction and disposed inside of said component and having concave portions facing in a first direction; and
a second set of semicircular pedestals spaced apart in said radial direction and nearest said first set of semicircular pedestals with respect to said first direction and having concave portions facing in a second direction opposite said first direction, wherein each of said first set of semicircular pedestals is radially staggered from each of said second set of semicircular pedestals, wherein said cooling system is a radial flow cooling system with respect to said engine centerline longitudinal axis, said first direction and said second direction are axial directions, and axes through said concave portions of the most axially adjacent ones of said first and second sets of pedestals are offset by a radial distance.

2. The gas turbine engine as recited in claim 1, comprising cooling holes disposed in open spaces between said first set of semicircular pedestals and said second set of semicircular pedestals.

3. The gas turbine engine as recited in claim 1, wherein the first set of semicircular pedestals and the second set of pedestals are disposed within a cavity.

4. The gas turbine engine as recited in claim 3, wherein the cavity is axially bound by one or more ribs.

5. The gas turbine engine as recited in claim 1, wherein the cooling system includes a third set of semicircular pedestals and a fourth set of semicircular pedestals.

6. The gas turbine engine as recited in claim 1, wherein the component is a turbine blade.

7. A gas turbine engine, comprising:
a component that extends into a core flow path of said gas turbine engine having an engine centerline longitudinal axis, wherein said component includes a cooling system having:
a first set of semicircular pedestals spaced apart in a radial direction and disposed inside of said component and having concave portions facing in a first direction; and
a second set of semicircular pedestals spaced apart in said radial direction and nearest said first set of semicircular pedestals with respect to said first direction and having concave portions facing in a second direction opposite said first direction, wherein each of said first set of semicircular pedestals is radially staggered from each of said second set of semicircular pedestals,
wherein said first and second sets of semicircular pedestals include at least one acceleration region and at least one deceleration region.

8. The gas turbine engine as recited in claim 7, comprising cooling holes disposed in open spaces between said first set of semicircular pedestals and said second set of semicircular pedestals.

9. The gas turbine engine as recited in claim 7, wherein the first set of semicircular pedestals and the second set of pedestals are disposed within a cavity.

10. The gas turbine engine as recited in claim 9, wherein the cavity is axially bound by one or more ribs.

11. The gas turbine engine as recited in claim 7, wherein the cooling system includes a third set of semicircular pedestals and a fourth set of semicircular pedestals.

12. The gas turbine engine as recited in claim 7, wherein the component is a turbine blade.

13. A gas turbine engine, comprising:
a component that extends into a core flow path of said gas turbine engine having an engine centerline longitudinal axis, wherein said component includes a cooling system having:
a first set of semicircular pedestals spaced apart in a radial direction and disposed inside of said component and having concave portions facing in a first direction; and
a second set of semicircular pedestals spaced apart in said radial direction and nearest said first set of semicircular pedestals with respect to said first direction and having concave portions facing in a second direction opposite said first direction, wherein each of said first set of semicircular pedestals is radially staggered from each of said second set of semicircular pedestals,
wherein said first and second sets of semicircular pedestals include multiple acceleration regions.

14. The gas turbine engine as recited in claim 13, comprising cooling holes disposed in open spaces between said first set of semicircular pedestals and said second set of semicircular pedestals.

15. The gas turbine engine as recited in claim 13, wherein the first set of semicircular pedestals and the second set of pedestals are disposed within a cavity.

16. The gas turbine engine as recited in claim 15, wherein the cavity is axially bound by one or more ribs.

17. The gas turbine engine as recited in claim 13, wherein the cooling system includes a third set of semicircular pedestals and a fourth set of semicircular pedestals.

18. The gas turbine engine as recited in claim 13, wherein the component is a turbine blade.

\* \* \* \* \*